(12) United States Patent
Pinera et al.

(10) Patent No.: US 9,964,073 B1
(45) Date of Patent: May 8, 2018

(54) LIQUID ROCKET ENGINE WITH HYBRID ELECTRIC MOTOR DRIVEN PUMP

(71) Applicants: Alejandro Pinera, Jupiter, FL (US); Timothy J Miller, Jupiter, FL (US)

(72) Inventors: Alejandro Pinera, Jupiter, FL (US); Timothy J Miller, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 692 days.

(21) Appl. No.: 14/548,598

(22) Filed: Nov. 20, 2014

Related U.S. Application Data

(63) Continuation-in-part of application No. 14/534,229, filed on Nov. 6, 2014, now abandoned.

(51) Int. Cl.
*F02K 9/46* (2006.01)
*F04D 13/08* (2006.01)
*F04D 7/00* (2006.01)

(52) U.S. Cl.
CPC .......... *F02K 9/46* (2013.01); *F04D 7/00* (2013.01); *F04D 13/086* (2013.01)

(58) Field of Classification Search
CPC ......... B64G 1/408; F04D 29/181; F04D 7/00; F04D 13/086; F02K 9/42; F02K 9/46; F02K 9/563
See application file for complete search history.

(56) References Cited

U.S. PATENT DOCUMENTS

| | | | | |
|---|---|---|---|---|
| 3,077,073 A | * | 2/1963 | Kuhrt | F02K 9/48 60/259 |
| 3,200,753 A | * | 8/1965 | Di Stefano | F04D 3/005 415/107 |
| 5,407,331 A | * | 4/1995 | Atsumi | F02M 37/048 417/420 |
| 8,240,976 B1 | * | 8/2012 | Kamio | F04D 29/448 415/1 |
| 2009/0324382 A1 | * | 12/2009 | Schmitz | F04D 27/001 415/1 |

OTHER PUBLICATIONS

Emdee "Launch Vehicle Propulsion" 2004.*
Houts "Nuclear Cryogenic Propulsion Stage" 2012.*
NASA NASA Researchers Studying Advanced Nuclear Rocket Technologies 2013.*

\* cited by examiner

*Primary Examiner* — William H Rodriguez
*Assistant Examiner* — William Breazeal
(74) *Attorney, Agent, or Firm* — John Ryznic

(57) ABSTRACT

A nuclear thermal rocket with a superconducting electric motor driven boost pump submerged within a tank of liquid hydrogen, where the boost pump is driven by both an electric motor and a turbine. The boost pump can be submerged in liquid hydrogen so that the electric motor operates as a superconducting motor. Also, a turbopump for a rocket engine can include both a turbine and an electric motor to drive the liquid oxidizer and liquid fuel pumps of the turbopump.

3 Claims, 9 Drawing Sheets

LIQUID ROCKET ENGINE WITH HYBRID ELECTRIC MOTOR DRIVEN PUMP

CROSS-REFERENCE TO RELATED APPLICATIONS

This application is a CONTINUATION-IN-PART of U.S. patent application Ser. No. 14/534,229 filed Nov. 6, 2014 and entitled SUPERCONDUCTING ELECTRIC BOOST PUMP FOR NUCLEAR THERMAL PROPULSION.

GOVERNMENT LICENSE RIGHTS

This invention was made with Government support under contract number NNX14CC39P awarded by NASA. The Government has certain rights in the invention.

BACKGROUND OF THE INVENTION

Field of the Invention

The present invention relates generally to a liquid rocket engine, and more specifically to a hybrid electric motor driven pump for the liquid rocket engine.

Description of the Related Art Including Information Disclosed Under 37 CFR 1.97 and 1.98

Human missions to Mars and other extraterrestrial bodies in our solar system such as asteroids will require innovative advanced propulsion systems that maximize performance, reliability and reusability while minimizing overall system mass. NASA's recent Mars Design Reference Architecture (DRA) 5.0 identified Nuclear Thermal Propulsion (NTP) as the system of choice due to its high thrust and high specific impulse yielding a significant advantage over traditional chemical propulsion rocket engines. The resulting launch mass reduction from NTP is as much as 530 metric tons according to one study. NERVA-derived and CERMET core designs have been stated as some of the approaches to be considered as part of an expander-driven thermodynamics engine system. However the Nuclear Thermal Rocket (NTR) engine architecture may provide opportunities for electric powered pumps that could provide improved reliability and operability.

FIGS. 1 and 8 shows prior art Nuclear Thermal Rockets in which a nuclear reactor is used to produce a high pressure gas from a cryogenic liquid such liquid hydrogen.

BRIEF SUMMARY OF THE INVENTION

A Nuclear Thermal Rocket with a nuclear reactor to convert a cryogenic liquid into a high temperature gas flow in a nozzle to produce thrust, the rocket including a cryogenic liquid boost pump submerged within a tank of liquid hydrogen that supplies low pressure liquid hydrogen to a main turbopump that pumps the liquid hydrogen to the reactor of the rocket.

The boost pump is a superconducting electric motor boost pump with an axial flow spiral shaped blade having a progressively decreasing flow area in order to allow for the boost pump to pump up to 50% vapor by volume, and an electric motor that enables detection of driving torque to control a speed of the boost pump to prevent cavitation. The boost pump can be a shroud mounted motor or a hub mounted motor.

The nuclear thermal rocket includes an energy storage device, such as a battery, a fuel cell, or a flywheel, to start the boost pump, where an electric generator driven by the main turbopump supplies electric power to drive the boost pump after the engine has been started.

In another embodiment of the boost pump, the electric motor is supplemented by a turbine supplied with high pressure LH2 from the main pump discharge. This has the advantage of reducing the size of the electric motor during high power operation. That is, extra power is provided to the boost pump during steady state (SS) operation to achieve higher pressure rise. The electric motor can then be used to throttle the boost pump by means of an electric controller. The controller can provide less power to the motor, thus reducing the pump speed and lowering the pressure rise. Or the opposite—it can give the motor more power and thus supplement the turbine power. The electric motor and controller can also be used to sense for cavitation events with the pump and throttle the pump as required to eliminate the cavitation.

Another benefit is that the electric motor provides the means for starting the engine or running at low power without the need for the turbine to be operated. This simplifies the starting transient greatly. Finally, if extra turbine power exists during SS operation and motor is not required, it could be reversed and run as a generator to recharge the batteries.

The boost pump with turbine and electric motor driven pump can be used in a staged combustion cycle rocket engine where the hybrid electric motor can be used to supplement the oxidizer boost pump. It can aide in throttling the boost pump during operation and starting the engine. This boost pump allows the main pump to spin faster without cavitating the LOX main pump which is on the same shaft. Additionally, the boost pump power can be supplemented with the electric motor during mixture ratio changes in the main chamber. Specifically, when the mixture ratio in the main chamber is increased from optimal.

In an expander cycle rocket engine, no boost pump is used but the hybrid electric pump is used on the hydrogen turbopump of the engine. This allows for making up the differences in heat exchanger variability from engine to engine which is a very common problem with expander cycle engines. Usually there is quite a bit of variability from engine to engine, so extra margin is incorporated in to the turbopump turbine. Orifices or valves are used to account for this variability. The electric motor in this application can make up the variability. This is in addition to the other benefits such as enabling higher starting torque and enabling closed loop chill downs.

In a gas generator cycle rocket engine, the hybrid electric turbopump is incorporated into a gas generator cycle. The motor is used to start the cycle (eliminates spin starts, pyro start cartridges and other external start augmentation systems) and provides for throttling supplementation and cavitation monitoring and suppression.

DETAILED DESCRIPTION OF THE INVENTION

Figure 1:
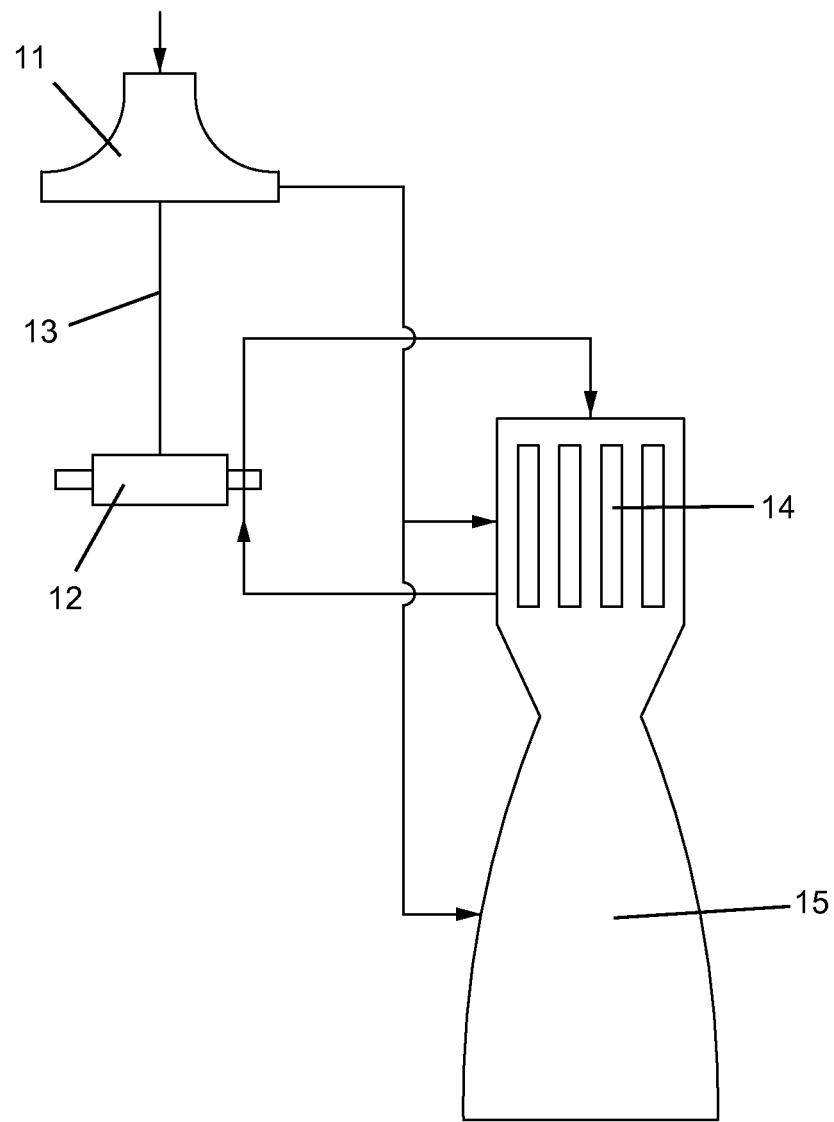
FIG. 1 shows a schematic view of a Nuclear Thermal Rocket of the prior art.

The present invention is a Nuclear Thermal Rocket (NTR) with a Superconducting electric boost pump submerged within liquid hydrogen that supplies low pressure liquid hydrogen to a main turbopump of the nuclear thermal rocket to produce thrust. The boost pump is used to supply a Nuclear Thermal Rocket (NPR) engine. The boost pump will flow liquid hydrogen with inlet conditions as low as 16 psia and temperature of 40 degrees R, with discharge pressure at a minimum of 32 psia and be operated with up to 50% vapor by volume. The boost pump is submerged at a bottom of the liquid hydrogen tank. The boost pump operates at around 6,000 rpm with around 35 HP.

The Bimodal Nuclear Thermal Rocket (BNTR) powered spacecraft architecture could provide a cost effective option to drive the pumps electrically, thus eliminating the thermal stresses and control challenges associated with turbine powered rotating pump machinery, and because the propellant for an NTR is hydrogen, high power density superconducting electric motors can be utilized.

The boost pump provides sub-cooled cryogenic fluid (enabling the main pump to operate at high speed without cavitation). This helps reduce helium consumption and enables the tank structural design to be optimized for thermal management and load carrying capability rather than for Net Positive Suction Pressure (NPSP) margin, potentially reducing the overall vehicle dry mass. An electrically driven boost pump submerged in the tank can also be used to precondition the inlet duct of the main pump (if not also located in the tank) prior to engine operation, eliminating a secondary recirculation pump that would otherwise be required to perform this duty.

Some of the safety, reliability and operational advantages of electric pumps and their implications provided to the NTP system architecture are discussed below. These advantages include: lower anticipated system pressures; predictable/active pump speed control; reduced thermal gradients in the Turbo Pump Assembly (TPA); reliability; lower system weight; serviceability; start and restart sequence simplicity; multi-speed control of the propellant pumps for an $O_2$ augmented NTR; and electric motors can be shielded to prevent Neutron flux heating. Because the turbine is eliminated in lieu of the electric motor, system pressures may be reduced considerably. A more simplistic control scheme as well as elimination of the turbine bypass valve could be realized.

Predictable active speed control means that when commanded, the motor will accelerate the pump in a repeatable manner to the requested design speed. Because the drive motor controller can provide the ability to directly monitor torque, it can also react to sudden changes in required torque for a given speed. This active pump speed control has already been implemented in commercial Variable Frequency Drive (VFD) logic to protect against cavitation to further extend the life of an electrically driven pump. Having an ability to adapt to changing load conditions provides a significant safety margin against premature failure of the pump and provides considerable benefit when considering the goal of ingesting 50% vapor by volume for up to 8 hours with less than 10% head fall off. These speed adjustments would occur very rapidly, resulting in little to no head fall off while protecting the pump from cavitation damage. This type of active control using torque feedback provides a robust method for preventing cavitation.

A submersible superconducting motor driven hydrogen boost pump has another significant advantage over a turbine driven boost pump in regards to thermal gradients in the machine. Because the pump and motor are at the same temperature, thermally induced stresses are essentially non-existent except for the need to design for assembly at room temperature and operation at 20 degrees Kelvin. Furthermore, superconducting motors are characterized by their extremely low electrical resistance which reduces the amount of heat generated in the windings resulting in less heat fed back into the tank. Thermally induced low cycle fatigue that occurs in the turbine and turbine housing is also eliminated (often a considerable concern when designing a long life turbine exposed to a large number of thermal cycles). In addition to heat transfer concerns associated with turbine gas causing heating of the shaft and pump housing, a seal-less pump can be designed which eliminates the required dynamic shaft seals and failure modes associated with preventing the higher pressure warm/hot turbine drive gas from leaking into the pump.

Reliability requirements for the pumps in a human rated NTR will need to be very high, especially when one considers the duration and number of cycles that may be required in an exploration vehicle. Superconducting electric motors have a significant advantage since one of the primary failure modes in electric motors is with overheating of the windings and differences in the thermal expansion of the wire within the motor leading to turn-to-turn shorts. In the superconducting motor, resistance in the windings is near zero and thus heating of the wire does not occur. This does present a challenge when testing the motor since a motor designed for superconducting operation may not be able to run at room temperature due to a high potential to overheat and fail. Thus, consideration in vehicle processing to prevent latent failures in the windings is required. As an added advantage with electric motors, it is possible to design the motor with redundant windings to ensure operation in the event of a winding turn-to-turn short. Monitoring of the motor windings using imbedded thermo-couples provides an added layer of protection that can be used by the motor controller to determine if an increase in current as detected by the controller is causing a problem.

Serviceability of an electric motor driven powerhead in an NTR is an additional benefit not likely available in a turbine driven style power head. This is simply because the pump can be mounted on the tank side of the radiation shield to prevent contamination by the reactor. In a turbine driven NTR, hydrogen circulates through the reactor at high pressure and temperature. To reduce tank heating, the typical turbopump fed NTR configuration requires the pump to be close mounted to the reactor and thus exposed to the reactor's radiation which may result in contamination of the pump. As a result, serviceability and repair of the turbopump, even if it can be removed from the engine could be hazardous to the crew. The electric pump on the other hand, could be located away from the reactor in an appropriately shielded location reducing risk to the crew if repairs and/or inspections are required (either during the mission or upon return to earth orbit).

Start and restart simplicity of an electric powerhead improves overall operability of the NTR. A turbine driven powerhead NTR start sequence is considerably more complex due to the hydro mechanical interactions between the pump and reactor heat exchanger that must be closely controlled by valves. With an electric drive, power provided by a dedicated generator, a Superconducting Magnetic Energy Storage (SMES) system, battery, fuel cell, etc. could be used to drive the pump independent of the reactor.

Figure 2:
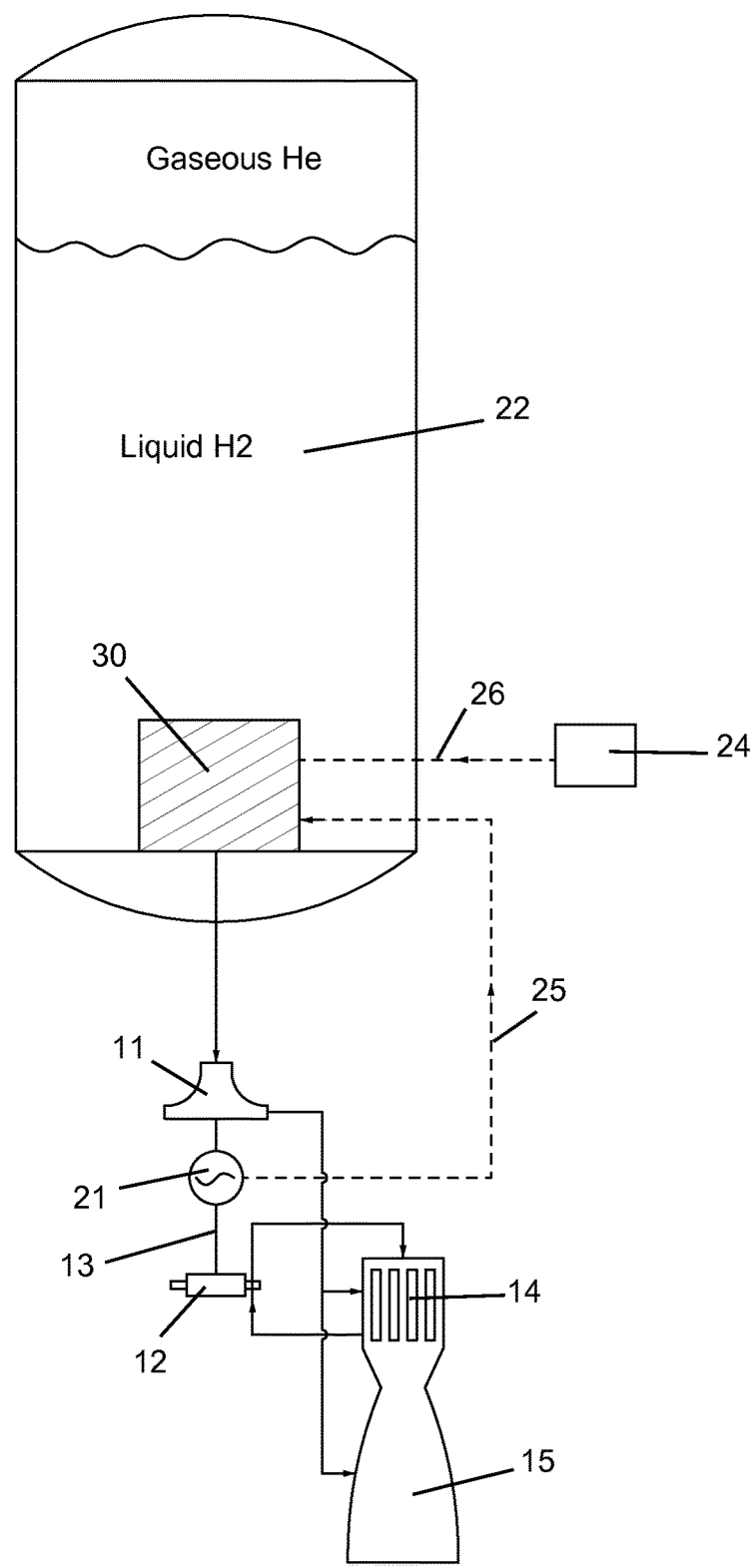
FIG. 2 shows a schematic view of a Nuclear Thermal Rocket with a submerged boost pump of the present invention.

The Nuclear Thermal Rocket of the present invention is shown in FIG. 2 with a tank 22 to hold liquid hydrogen and gaseous helium, an electric boost pump 30 located at a bottom of the tank 22, a centrifugal pump 11 connected to an axial flow turbine 12 by a shaft with an electric generator 21 connected to the shaft such that rotation of the shaft rotates the electric generator to produce electrical power, a stored energy device 24 such as a battery, a capacitor, a fuel cell, etc. to supply starting electrical power to the boost pump, and the core of the thermal nuclear rocket with a chamber 14 to produce a hot gas flow from the liquid hydrogen and a nozzle 15 to produce thrust. The gaseous helium pushes the liquid hydrogen into an inlet of the boost pump 30. The boost pump pressurizes the liquid hydrogen for inlet to the main turbopump (11,12) to further pressurize the liquid hydrogen to pass through the heat exchangers in the engine and then into the chamber 14 where the nuclear reactor produces a hot gas flow to propel the rocket.

The stored energy device 24 is used to start the boost pump 30 through electrical line 26. When the main turbopump 11 and 12 is operating, the electric generator 21 is used to supply electrical power to the boost pump through electrical line 25.

Figure 3:
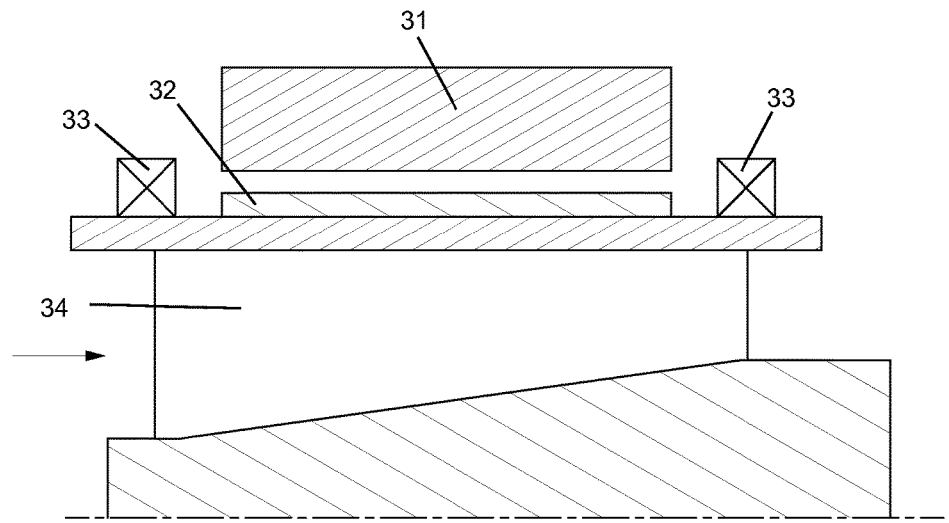
FIG. 3 shows schematic view of an electric boost pump in a first embodiment of the present invention.

FIG. 3 shows a first embodiment of the boost pump which is a shroud mounted motor with a stator 31 mounted outside of the rotor 32, and two bearings 33 to support the rotor having a number of blades 34 that pump the liquid hydrogen.

Figure 4:
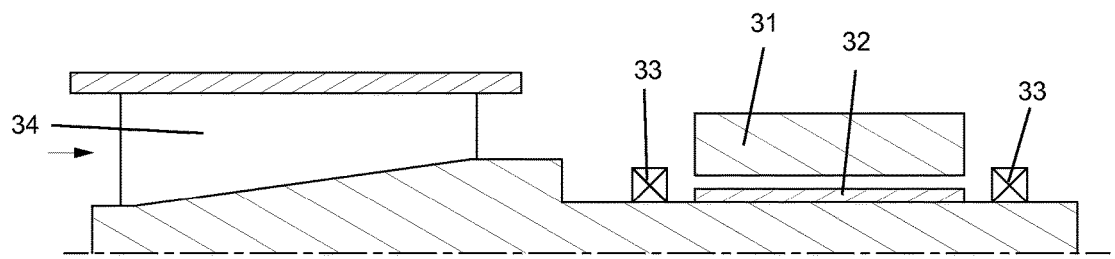
FIG. 4 shows a schematic view of an electric boost pump in a second embodiment of the present invention.

FIG. 4 shows a second embodiment of the boost pump which is a hub mounted motor with the stator 31 mounted outside of the rotor 32 supported by two bearings 33, and a hub extending outward on which axial blades 34 are located.

Figure 5:
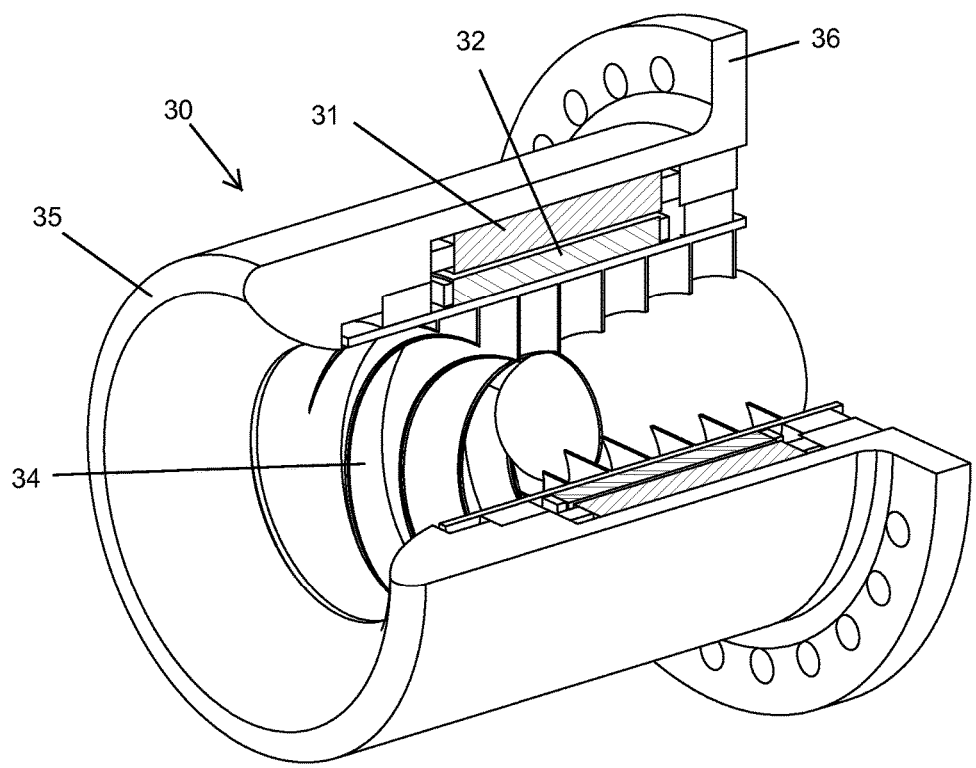
FIG. 5 shows a cut-away view of the electric boost pump of the first embodiment of the present invention.

FIG. 5 shows a schematic with a cut-away section of the boost pump in the shroud mounted motor of the first embodiment. The boost pump includes low pressure blades in the inlet end and high pressure blades in the outlet end. The stator 31 and rotor 32 are superconducting. The entire boost pump is submerged within the liquid hydrogen in the tank 22. The boost pump includes a flange 36 for mounting to the tank 22 and a housing 35 enclosing the stator and rotor and blades.

Figure 6:
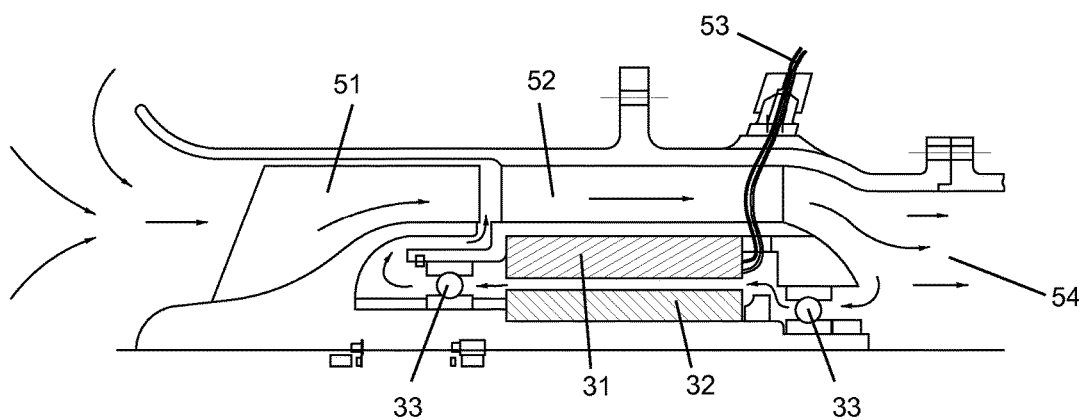
FIG. 6 shows a cross section view of the electric boost pump of the second embodiment in more detail.

FIG. 6 shows a more detailed view of the boost pump of the second embodiment for the hub mounted motor. An inducer 51 is located on the inlet end. A plurality of hollow struts 52 are located outward of the stator 31 and rotor 32. Two bearings 33 support the rotor and hub and blades. Wires 53 supply electric power to the electric motor. A discharge 54 is located at the outlet end of the boost pump.

Figure 7:
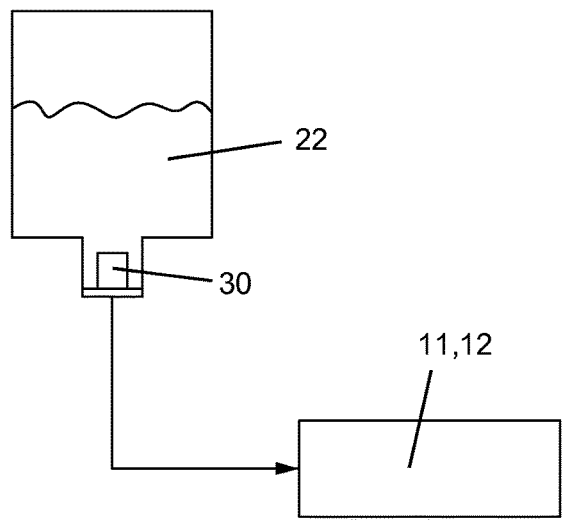
FIG. 7 shows a schematic view of a liquid hydrogen tank with submerged boost pump connected to the main turbopump according to the present invention.
Figure 8:
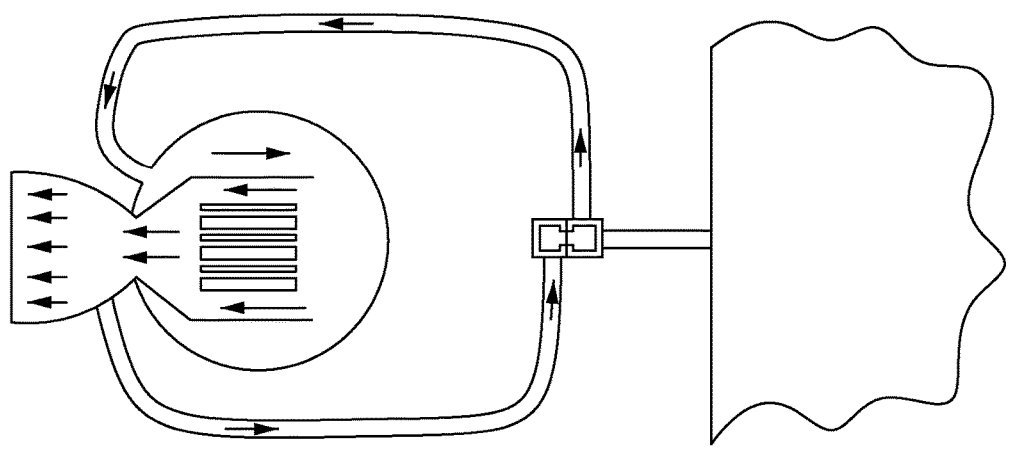
FIG. 8 shows a cross section view of a Nuclear Thermal Rocket of the prior art.

FIG. 7 shows the tank 22 with liquid hydrogen and the electric boost pump 30 located in the bottom of the tank submerged within the liquid hydrogen. The boost pump is connected to an inlet of the main turbopump 11 and 12 to deliver pressurized liquid hydrogen to the main turbopump 11 and 12.

The submerged superconducting motor driven axial pump for liquid hydrogen is capable of ingesting 50% vapor by volume. A motor controller is used to sense vapor ingestion (via through reduced torque needed) and slow the pump down to prevent cavitation. A stored energy device 24 (battery, flywheel, capacitor, fuel cell) is used for starting the boost pump or for short runs. An electric generator 21 connected to the shaft of the main turbopump 11 and 12 is used to produce electric power for the electric boost pump 30.

Figure 9:
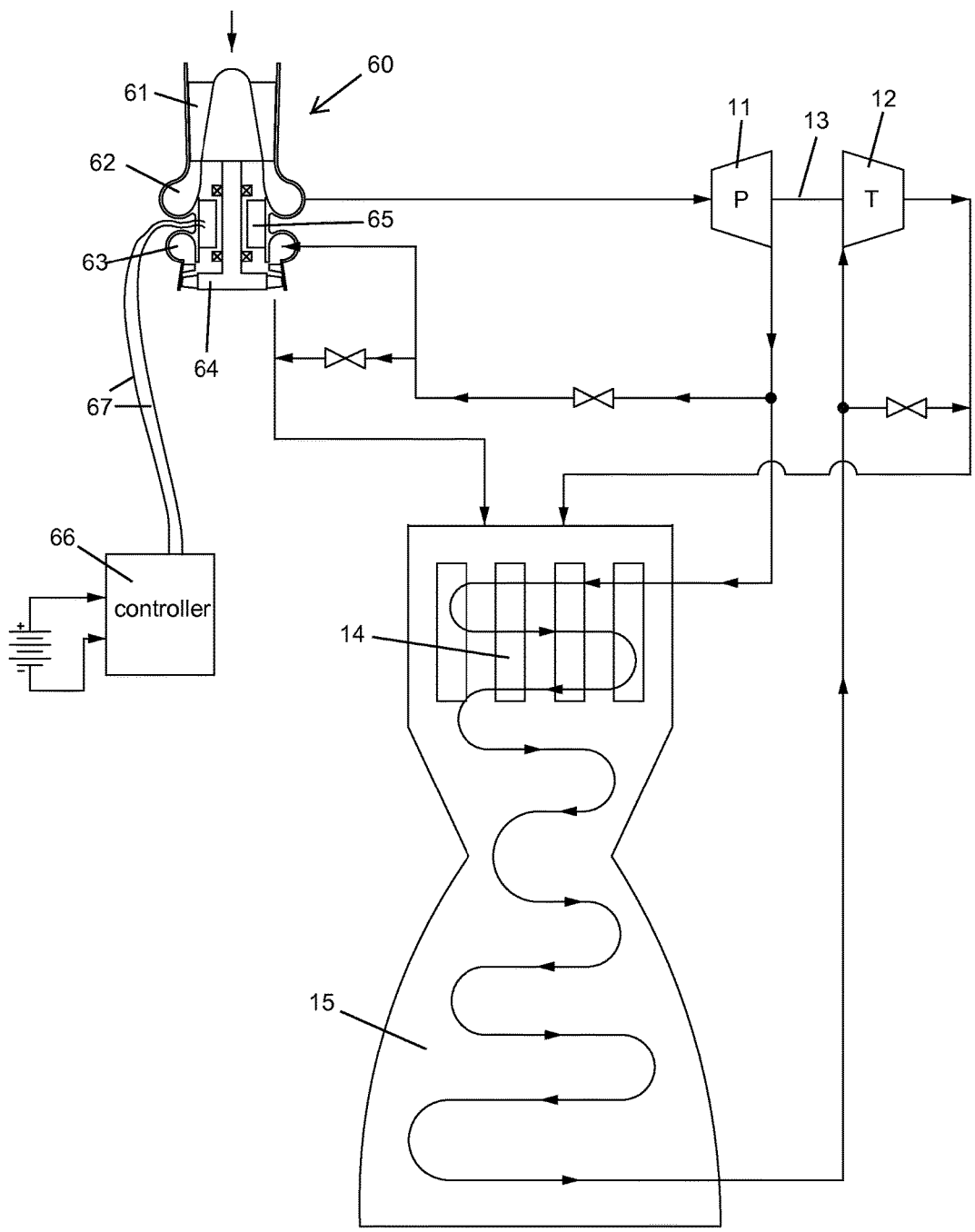
FIG. 9 shows a schematic view of another embodiment of a Nuclear Thermal Rocket with a cross section of the hybrid electric motor driven pump of the present invention.

FIG. 9 shows an embodiment of the Nuclear Thermal Rocket with a hybrid electric motor driven pump used for a boost pump to the main turbopump 11 and 12. The boost pump 60 can be submerged in the liquid hydrogen tank so that the electric motor is superconducting. The boost pump in FIG. 9 is a hybrid pump driven by an electric motor 65 and a turbine 64. The boost pump includes blades 61, an outlet 62 for the liquid to the main turbopump 11-13, an inlet 63 for the pressurized liquid hydrogen from the main turbopump 11-13, an electric motor controller 66, and electrical wires 67 from the controller 66 to the electric motor 65. Some of the pressurized liquid hydrogen from the main turbopump is passed through the axial flow turbine 64 to drive the boost pump 60 and pressurize the liquid hydrogen from the tank before entering the main turbopump in order to eliminate cavitation.

The hybrid pump 60 can be driven at low speed or started using the electric motor 65. When the boost pump is operating at full capacity, the electric motor can be shut off and only the turbine 64 is used to drive the boost pump. The electric motor 65 can still be used to supplement the turbine drive so that both motor and turbine can be used to drive the boost pump.

Figure 10:
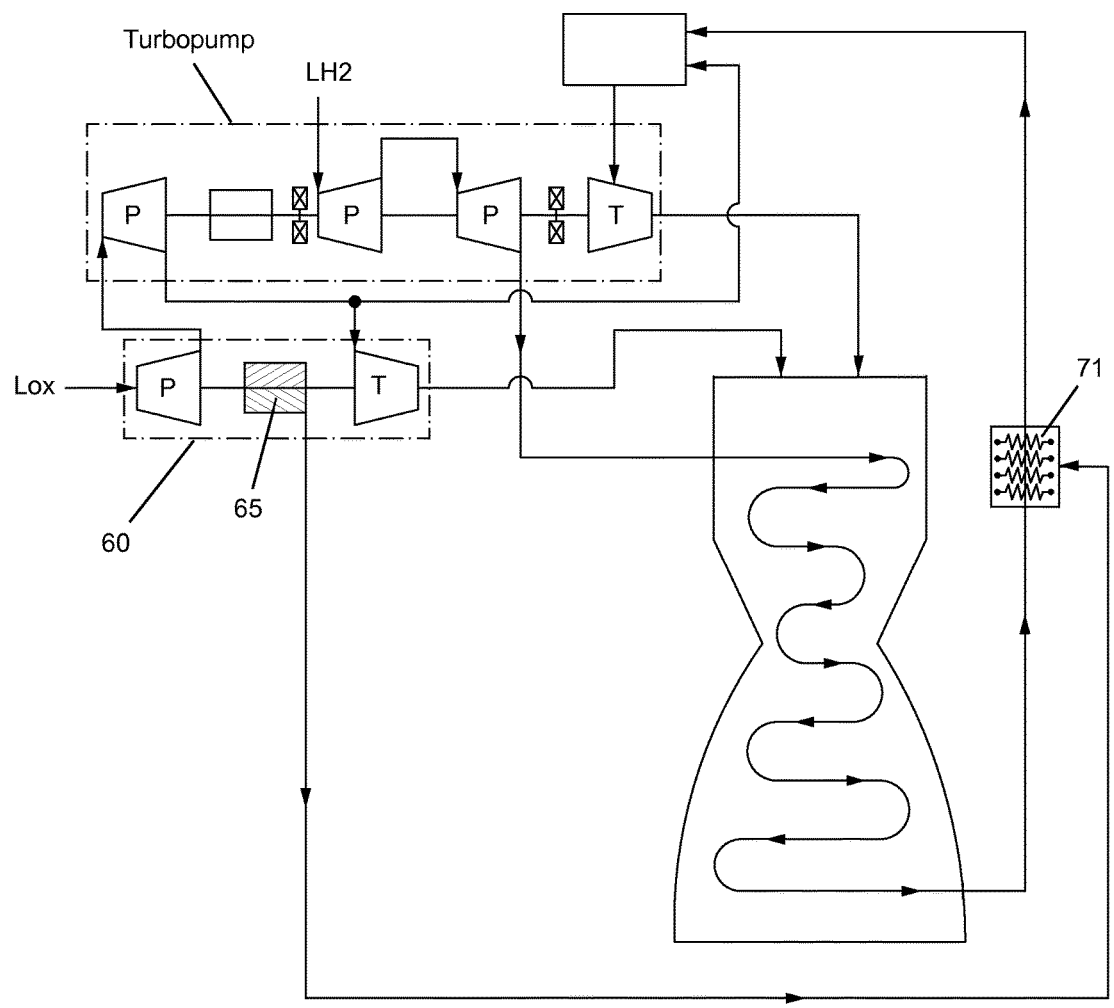
FIG. 10 shows a schematic view of a staged combustion cycle rocket engine with the boost pump of the present invention.

FIG. 10 shows a staged combustion cycle rocket engine in which the boost pump of the present invention is used to pressurize liquid oxygen prior to introduction into the main turbopump in order to prevent cavitation. The hybrid electric motor driven pump 60 includes an electric motor 65 and a turbine to drive the pump that delivers relatively low pressure liquid oxygen to an inlet of the main turbopump. The boost pump 60 in FIG. 10 does not need to be submerged within the liquid oxygen tank but can be located external to the LOX tank. The main turbopump pressurizes both the LOX and the $LH_2$ for delivery to the combustion chamber of the engine. A resistor/load bank 71 is also used in which heated LH2 that passes through the heat exchanger associated with the nozzle is used to cool the resistor/load bank. The resistor/load bank 71 is used to dump power when the motor 65 is used as a generator in order to brake or slow down the boost pump.

Figure 11:
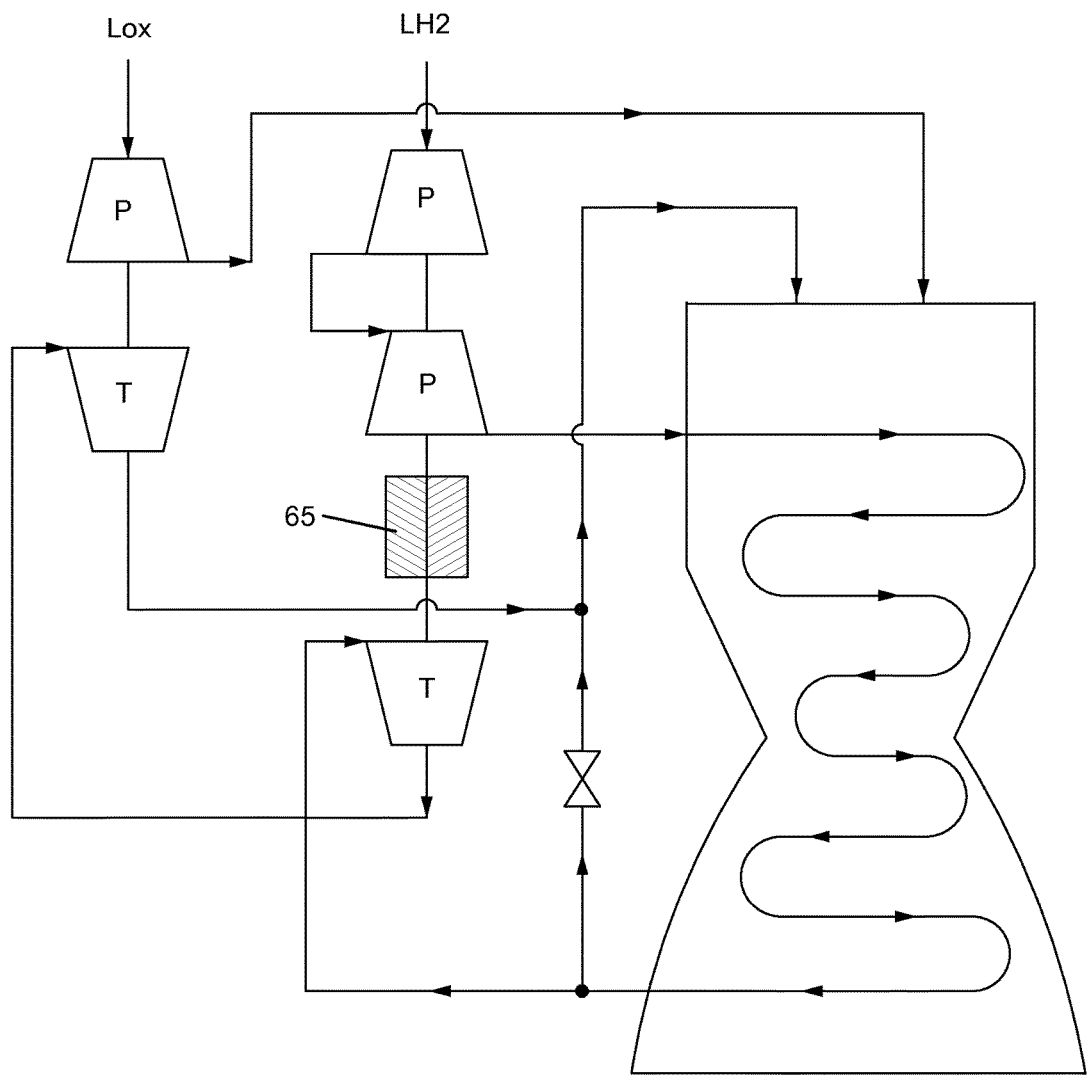
FIG. 11 shows a schematic view of an expander combustion cycle rocket engine with the hybrid electric motor driven pump of the present invention.

FIG. 11 shows an expander cycle rocket engine with a hybrid main turbopump that is driven with an electric motor 65 and an axial flow gas turbine. $LH_2$ that passes through the heat exchanger of the nozzle is used to drive a turbine that then drives a low pressure pump and a high pressure pump of the main turbopump. The $LH_2$ flows through a second turbine that drives a pump for the LOX. The electric motor 65 is used on the $LH_2$ turbopump of the engine.

Figure 12:
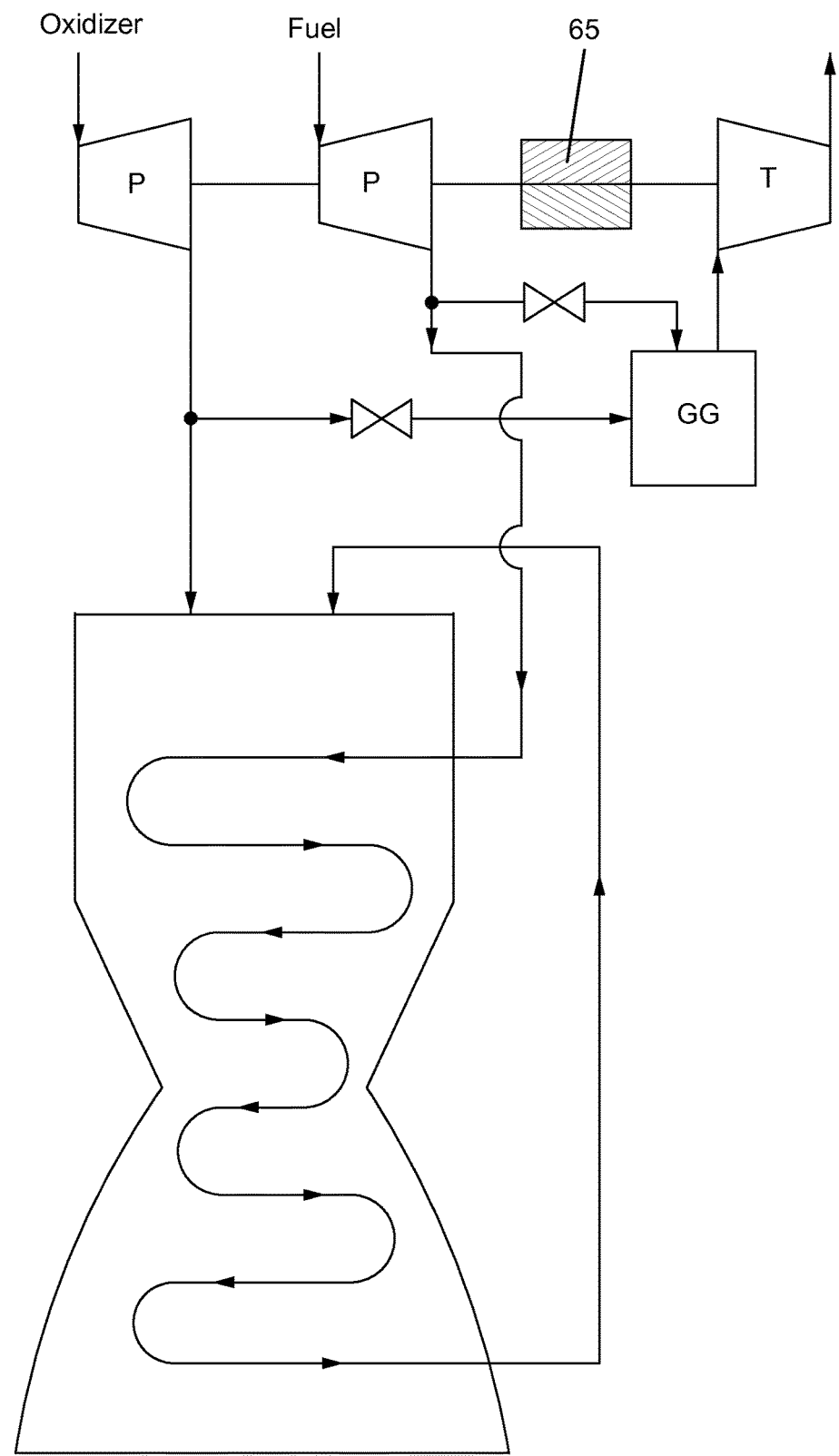
FIG. 12 shows a schematic view of a gas generator cycle rocket engine with the hybrid electric motor driven pump of the present invention.

FIG. 12 shows a gas generator cycle rocket engine with a hybrid electric motor driven pump of the present invention. An oxidizer pump and a fuel pump are both driven by a turbine and an electric motor 65. The gas generator combines the oxidizer and the fuel to produce a hot gas flow that is used to drive the turbine of the turbopump. The electric motor 65 is used to start the engine and to provide for throttling capability as well as for cavitation monitoring and suppression of the turbopump.

We claim the following:
1. A boost pump for a liquid rocket engine, the boost pump comprises:
   a blade to pressurize a cryogenic liquid;
   an electric motor to drive the blade of the boost pump;

a turbine connected to a rotor of the blade to drive the blade of the boost pump;
an electric motor controller to control operation of the electric motor of the boost pump; and
the electric motor is reversed to be a generator and generator power is discharged to a resistive load bank.

2. The boost pump of claim 1 and further comprising:
the motor controller can demand more or less power to either slow or speed up the boost pump in order to suppress cavitation.

3. A liquid rocket engine comprising:
a combustion chamber to produce a hot gas from combining a liquid fuel with a liquid oxidizer;
a turbopump with a gas turbine driving both a liquid fuel pump and a liquid oxidizer pump;
a boost pump having an outlet connected to an inlet of the liquid oxidizer pump to provide pressurized liquid oxidizer to the liquid oxidizer pump to prevent cavitation;
an electric motor/generator connected to the boost pump to drive the boost pump or be driven by the boost pump and produce electrical power;
a battery to receive electrical power from the electric motor/generator to charge the battery;
a resistor/load bank to dissipate electrical power produced by the electric motor/generator;
a heat exchanger around the combustion chamber to pass liquid fuel; and,
the liquid fuel that is passed through the heat exchanger is also passed through the resistor/load bank to cool the resistor/load bank.

\* \* \* \* \*